United States Patent [19]
Kobayashi

[11] Patent Number: 5,926,753
[45] Date of Patent: Jul. 20, 1999

[54] RADIO SELECTION CALL RECEIVER CAPABLE OF INCREASING RECEIVING RATIO

[75] Inventor: Yasuhiro Kobayashi, Shizuoka, Japan

[73] Assignee: NEC Corporation, Tokyo, Japan

[21] Appl. No.: 08/883,064

[22] Filed: Jun. 26, 1997

[30] Foreign Application Priority Data

Jun. 27, 1996 [JP] Japan ..................................... 8-167126

[51] Int. Cl.⁶ ............................... H04Q 7/14; H04Q 7/18
[52] U.S. Cl. .......................... 455/406; 455/343; 455/38.3; 455/234.1; 340/825.47; 340/825.44
[58] Field of Search ................... 455/406, 38.3, 455/234.1, 343, 310, 31.2, 31.3; 340/825.44, 835.47, 311.1

[56] References Cited

U.S. PATENT DOCUMENTS

| | | | |
|---|---|---|---|
| 5,031,233 | 7/1991 | Ragan | 455/307 |
| 5,590,401 | 12/1996 | Ide et al. | 455/38.3 |
| 5,606,740 | 2/1997 | Niratsuka et al. | 455/343 |
| 5,778,312 | 7/1998 | Kawashima | 455/343 |

FOREIGN PATENT DOCUMENTS 5-235828  9/1993  Japan .

Primary Examiner—Dwayne D. Bost
Assistant Examiner—Alan Gantt
Attorney, Agent, or Firm—Scully, Scott, Murphy & Presser

[57] ABSTRACT

In a radio selection call receiver, a high frequency amplifier amplifies a received signal from an antenna to produce an amplified signal. A filter eliminates an undesired wave form the amplified signal to produce a filtered signal. A frequency converter converts a frequency of the filtered signal to produce a converted signal. A demodulator demodulates the converted signal to produce a demodulated baseband signal. A control circuit compares a call number signal from the demodulated baseband signal with the predetermined call number signal to produce a coincidence signal when the call number signal coincides with the predetermined call number signal. The frequency converter comprises a power supply voltage switching circuit for switching one of power supply voltages to another of the power supply voltages when the power supply voltage switching circuit is supplied with a control signal and a bias switching circuit for switching one of direct current voltages to another of the direct current voltages when the bias switching circuit is supplied with the control signal. The control circuit generates the control signal when the call number signal does not coincide with the predetermined call number signal.

8 Claims, 6 Drawing Sheets

RADIO SELECTION CALL RECEIVER CAPABLE OF INCREASING RECEIVING RATIO

BACKGROUND OF THE INVENTION

This invention relates to a radio selection call receiver which is used for a call communication of a radio signal, and more particularly, to a radio selection call receiver which eliminates a mutual modulation which is caused by undesired waves having adjacent frequencies.

DESCRIPTION OF THE RELATED ART

Recently, a radio call service remarkably prevails and radio frequencies which are used for the radio call service are, at an increasing temp, increased with liberalization of the radio call service. Therefore, the radio frequencies which are used for the radio call service are adjacent and there are a number of other radio call frequencies (undesired waves) together with a self radio call frequency (desired wave). Under a circumstance of existence of a number of undesired waves, a receiving ratio of the desired wave in the radio selection call receiver is dscreased by interference between the desired wave and the undesired wave. Particularly, the receiving ratio of the desired wave is remarkably dscreased near such as a transmitting tower.

When the mutual modulation due to the undesired wave occurs under a circumstance of existence of a number of undesired waves, a conventional radio selection call receiver which is capable of increasing the receiving ratio is described in Japanese Unexamined Patent Prepublication (koukai) No. 235828/1993.

The conventional radio selection call receiver comprises an antenna, an attenuator, a high frequency amplifier, a demodulator, a control circuit, and an annunciator.

The antenna receives a radio signal from a base station and produces a received signal. The attenuator is connected to antenna and processes the received signal to produce one of an attenuated signal and a non-attenuated signal (the received signal). The high frequency amplifier is connected to the attenuator. The high frequency amplifier amplifies the one of the attenuated signal and the non-attenuated signal and produces an amplified signal. The demodulator is connected to the high frequency amplifier and demodulates the amplified signal to produce a demodulated baseband signal.

The control circuit is connected to the demodulator and the attenuator. The control circuit comprises an extracting circuit, a memory circuit, and a comparing circuit. The extracting circuit extracts a call number signal from the demodulated baseband signal. The memory circuit memorizes a predetermined call number signal. The comparing circuit is connected to the extracting circuit and the memory circuit. The comparing circuit compares the call number signal with the predetermined call number signal to produce a coincidence signal when the call number signal coincides with the predetermined call number signal. The annunciator is connected to the control circuit. The annunciator annunciates a call to a person by generating a sound or a vibration and by representing the call when the annunciator is supplied with the coincidence signal.

The control circuit further comprises a binary signal generating circuit which generates a binary control signal when the call number signal does not coincide with the predetermined call number signal. The binary signal generating circuit supplies the binary control signal to the attenuator. The attenuator attenuates, at a predetermined attenuating level, the received signal from the antenna to produce the attenuated signal only when the attenuator is supplied with the binary control signal. Thus, when attenuator attenuates, at the predetermined attenuating level, the received signal, it is possible to eliminate an undesired wave from the received signal and to exract an only desired wave from the received signal.

However, in the conventional radio selection call receiver, the attenuator attenuates, at the predetermined attenuating level, the received signal from the antenna to produce the attenuated signal only when the attenuator is supplied with the binary control signal and the high frequency amplifier amplifies the attenuated signal. Therefore, when the attenuator is supplied with the received signal which has a level greater than the predetermined attenuating level, a receiving ratio is decreased by a cross modulation.

Also, in the conventional radio selection call receiver, even when the amplified signal of the high frequency amplifier has not a distortion, it is easy that the demodulated baseband signal of the demodulator has a inter-modulation distortion. Consequently, the receiving ratio is decreased.

SUMMARY OF THE INVENTION

It is therefore an object of this invention to provide a radio selection call receiver which is capable of increasing a receiving ratio.

It is another object of this invention to provide a radio selection call receiver which is capable of eliminating an undesired wave.

Other objects of this invention will become clear as the description proceeds.

According to a first aspect of this invention, there is provided a radio selection call receiver comprising:

an antenna for receiving a radio signal to produce a received signal;

a high frequency amplifier connected to the antenna for amplifying the received signal to produce an amplified signal;

a filter connected to the high frequency amplifier for eliminating an undesired wave form the amplified signal to produce a filtered signal;

a frequency converter connected to the filter for converting a frequency of the filtered signal to produce a converted signal;

a demodulator connected to the frequency converter for demodulating the converted signal to produce a demodulated baseband signal;

a control circuit connected to the demodulator and comprising an extracting circuit for extracting a call number signal from the demodulated baseband signal, a memory circuit for memorizing a predetermined call number signal, and a comparing circuit connected to the extracting circuit and the memory circuit for comparing the call number signal with the predetermined call number signal to produce a coincidence signal when the call number signal coincides with the predetermined call number signal; and an annunciator connected to the control circuit for annunciating a call when the annunciator is supplied with the coincidence signal;

the frequency converter connected to the control circuit and comprising a power supply voltage switching circuit for switching one of power supply voltages to another of the power supply voltages when the power supply voltage switching circuit is supplied with a control signal and a bias switching circuit for switching one of direct current voltages to another of the direct current voltages when the bias switching circuit is supplied with the control signal;

the control circuit connected to the power supply voltage switching circuit and the bias switching circuit and comprising a control signal generating circuit for generating a control signal when the call number signal does not coincide with the predetermined call number signal, the control signal generating circuit being for supplying the control signal to the power supply voltage switching circuit and the bias switching circuit.

According to a second aspect of this invention, there is provided a radio selection call receiver comprising:

an antenna for receiving a radio signal to produce a received signal;

a high frequency amplifier connected to the antenna for amplifying the received signal to produce an amplified signal;

a filter connected to the high frequency amplifier for eliminating an undesired wave form the amplified signal to produce a filtered signal;

a frequency converter connected to the filter for converting a frequency of the filtered signal to produce a converted signal;

a demodulator connected to the frequency converter for demodulating the converted signal to produce a demodulated baseband signal;

a control circuit connected to the demodulator and comprising an extracting circuit for extracting a call number signal from the demodulated baseband signal, a memory circuit for memorizing a predetermined call number signal, and a comparing circuit connected to the extracting circuit and the memory circuit for comparing the call number signal with the predetermined call number signal to produce a coincidence signal when the call number signal coincides with the predetermined call number signal; and an annunciator connected to the control circuit for annunciating a call when the annunciator is supplied with the coincidence signal;

the frequency converter connected to the control circuit and comprising a power supply voltage switching circuit for switching a first power supply voltage to a second power supply voltage greater than the first power supply voltage when the power supply voltage switching circuit is supplied with a first control signal from the control circuit and a bias switching circuit for switching a first direct current voltage to a second direct current voltage greater than the first direct current voltage when the bias switching circuit is supplied with the first control signal from the control circuit, the power supply voltage switching circuit being for switching the second power supply voltage to the first power supply voltage when the power supply voltage switching circuit is supplied with a second control signal form the control circuit, the bias switching circuit being for switching the second direct current voltage to the first direct current voltage when the bias switching circuit is supplied with the second control signal form the control circuit;

the control circuit connected to the power supply voltage switching circuit and the bias switching circuit and comprising a first control signal generating circuit and a second control signal generating circuit, the first control signal generating circuit being for generating the first control signal when the call number signal does not coincide with the predetermined call number signal to supply the first control signal to the power supply voltage switching circuit and the bias switching circuit, the second control signal generating circuit being for generating the second control signal when a predetermined time period elapses after a time instant of producing of the first control signal to supply the second control signal to the power supply voltage switching circuit and the bias switching circuit.

According to a third aspect of this invention, there is provided a radio selection call receiver comprising:

an antenna for receiving a radio signal to produce a received signal;

a high frequency amplifier connected to the antenna for amplifying the received signal to produce an amplified signal;

a filter connected to the high frequency amplifier for eliminating an undesired wave form the amplified signal to produce a filtered signal;

a switching circuit connected to the filter;

a first frequency converter connected to the filter through the switching circuit and having a first dynamic range for converting a frequency of the filtered signal to produce a first converted signal;

a second frequency converter connected to the filter through the switching circuit and having a second dynamic range greater than the first dynamic range for converting a frequency of the filtered signal to produce a second converted signal;

a demodulator connected to the first and second frequency converters for demodulating one of the first and second converted signals to produce a demodulated baseband signal;

a control circuit connected to the demodulator and comprising an extracting circuit for extracting a call number signal from the demodulated baseband signal, a memory circuit for memorizing a predetermined call number signal, and a comparing circuit connected to the extracting circuit and the memory circuit for comparing the call number signal with the predetermined call number signal to produce a coincidence signal when the call number signal coincides with the predetermined call number signal; and an annunciator connected to the control circuit for annunciating a call when the annunciator is supplied with the coincidence signal;

the switching circuit connected to the control circuit for switching from the first frequency converter to the second frequency converter to connect the filter to the second frequency converter when the switching circuit is supplied with a control signal;

the control circuit connected to the switching circuit and comprising a control signal generating circuit for generating a control signal when the call number signal does not coincide with the predetermined call number signal, the control signal generating circuit being for supplying the control signal to the switching circuit.

According to a fourth aspect of this invention, there is provided a radio selection call receiver comprising:

an antenna for receiving a radio signal to produce a received signal;

a high frequency amplifier connected to the antenna for amplifying the received signal to produce an amplified signal;

a filter connected to the high frequency amplifier for eliminating an undesired wave form the amplified signal to produce a filtered signal;

a switching circuit connected to the filter;

a first frequency converter connected to the filter through the switching circuit and having a first dynamic range for converting a frequency of the filtered signal to produce a first converted signal;

a second frequency converter connected to the filter through the switching circuit and having a second dynamic range greater than the first dynamic range for converting a frequency of the filtered signal to produce a second converted signal;

a demodulator connected to the first and second frequency converters for demodulating one of the first and second converted signals to produce a demodulated baseband signal;

a control circuit connected to the demodulator and comprising an extracting circuit for extracting a call number signal from the demodulated baseband signal, a memory circuit for memorizing a predetermined call number signal, and a comparing circuit connected to the extracting circuit and the memory circuit for comparing the call number signal with the predetermined call number signal to produce a coincidence signal when the call number signal coincides with the predetermined call number signal; and an annunciator connected to the control circuit for annunciating a call when the annunciator is supplied with the coincidence signal;

the switching circuit connected to the control circuit for switching from the first frequency converter to the second frequency converter to connect the filter to the second frequency converter when the switching circuit is supplied with a first control signal from the control circuit, the switching circuit being for switching from the second frequency converter to the first frequency converter to connect the filter to the first frequency converter when the switching circuit is supplied with a second control signal from the control circuit;

the control circuit connected to the switching circuit and comprising a first control signal generating circuit and a second control signal generating circuit, the first control signal generating circuit being for generating the first control signal when the call number signal does not coincide with the predetermined call number signal, the first control signal generating circuit being for supplying the first control signal to the switching circuit, the second control signal generating circuit being for generating the second control signal when a predetermined time period elapses after a time instant of producing of the first control signal, the second control signal generating circuit being for supplying the second control signal to the switching circuit.

DESCRIPTION OF THE PREFERRED EMBODIMENTS

Figure 1:
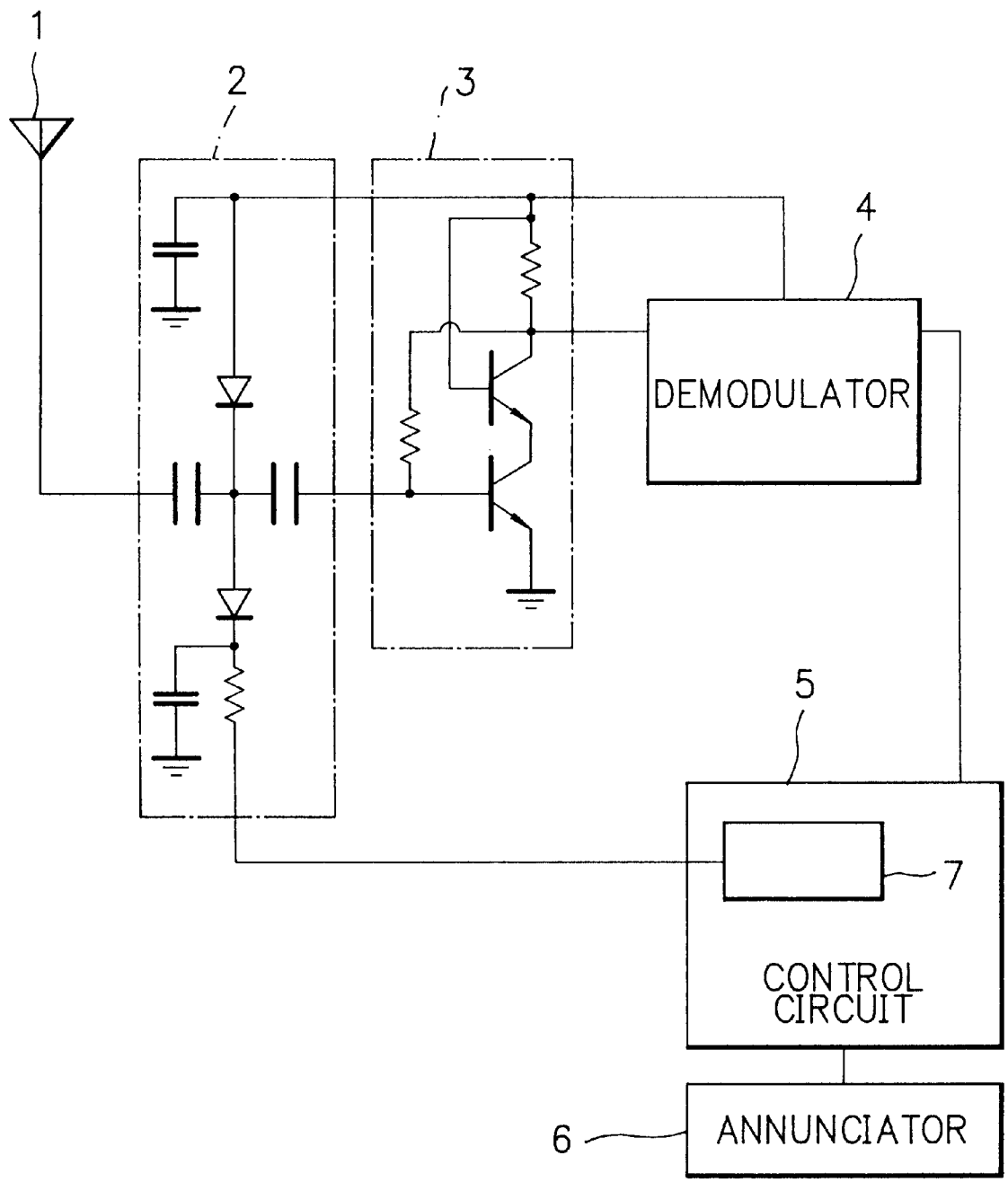
FIG. 1 is a block diagram of a conventional radio selection call receiver.

Referring to FIG. 1, a conventional radio selection call receiver will first be described for a better understanding of this invention.

The conventional radio selection call receiver comprises an antenna 1, an attenuator 2, a high frequency amplifier 3, a demodulator 4, a control circuit 5, and an annunciator 6.

The antenna 1 receives a radio signal from a base station (not shown) and produces a received signal. The attenuator 2 is connected to the antenna 1 and processes the received signal to produce one of an attenuated signal and a non-attenuated signal (the received signal). The high frequency amplifier 3 is connected to the attenuator 2. The high frequency amplifier 3 amplifies the one of the attenuated signal and the non-attenuated signal and produces an amplified signal. The demodulator 4 is connected to the high frequency amplifier 3 and demodulates the amplified signal to produce a demodulated baseband signal.

The control circuit 5 is connected to the demodulator 4 and the attenuator 2. The control circuit 5 comprises an extracting circuit, a memory circuit, and a comparing circuit. The extracting circuit extracts a call number signal from the demodulated baseband signal. The memory circuit memorizes a predetermined call number signal. The comparing circuit is connected to the extracting circuit and the memory circuit. The comparing circuit compares the call number signal with the predetermined call number signal to produce a coincidence signal when the call number signal coincides with the predetermined call number signal. The annunciator 6 is connected to the control circuit 5. The annunciator 6 annunciates a call to a person by generating a sound or a vibration and by representing the call when the annunciator is supplied with the coincidence signal.

The control circuit 5 further comprises a binary signal generating circuit 7 which generates a binary control signal when the call number signal does not coincide with the predetermined call number signal. The binary signal generating circuit 7 supplies the binary control signal to the attenuator 2. The attenuator 2 attenuates, at a predetermined attenuating level, the received signal from the antenna 1 to produce the attenuated signal only when the attenuator 2 is supplied with the binary control signal. Thus, when attenuator 2 attenuates, at the predetermined attenuating level, the received signal, it is possible to eliminate an undesired wave from the received signal and to exract an only desired wave from the received signal.

However, in the conventional radio selection call receiver, the attenuator 2 attenuates, at the predetermined attenuating level, the received signal from the antenna 1 to produce the attenuated signal only when the attenuator 2 is supplied with the binary control signal and the high frequency amplifier 3 amplifies the attenuated signal. Therefore, when the attenuator 2 is supplied with the received signal which has a level greater than the predetermined attenuating level, a receiving ratio is decreased by a cross modulation.

Also, in the conventional radio selection call receiver, even when the amplified signal of the high frequency amplifier 3 has not a distortion, it is easy that the demodulated baseband signal of the demodulator 4 has a inter-modulation distortion. Consequently, the receiving ratio is decreased.

Figure 2:
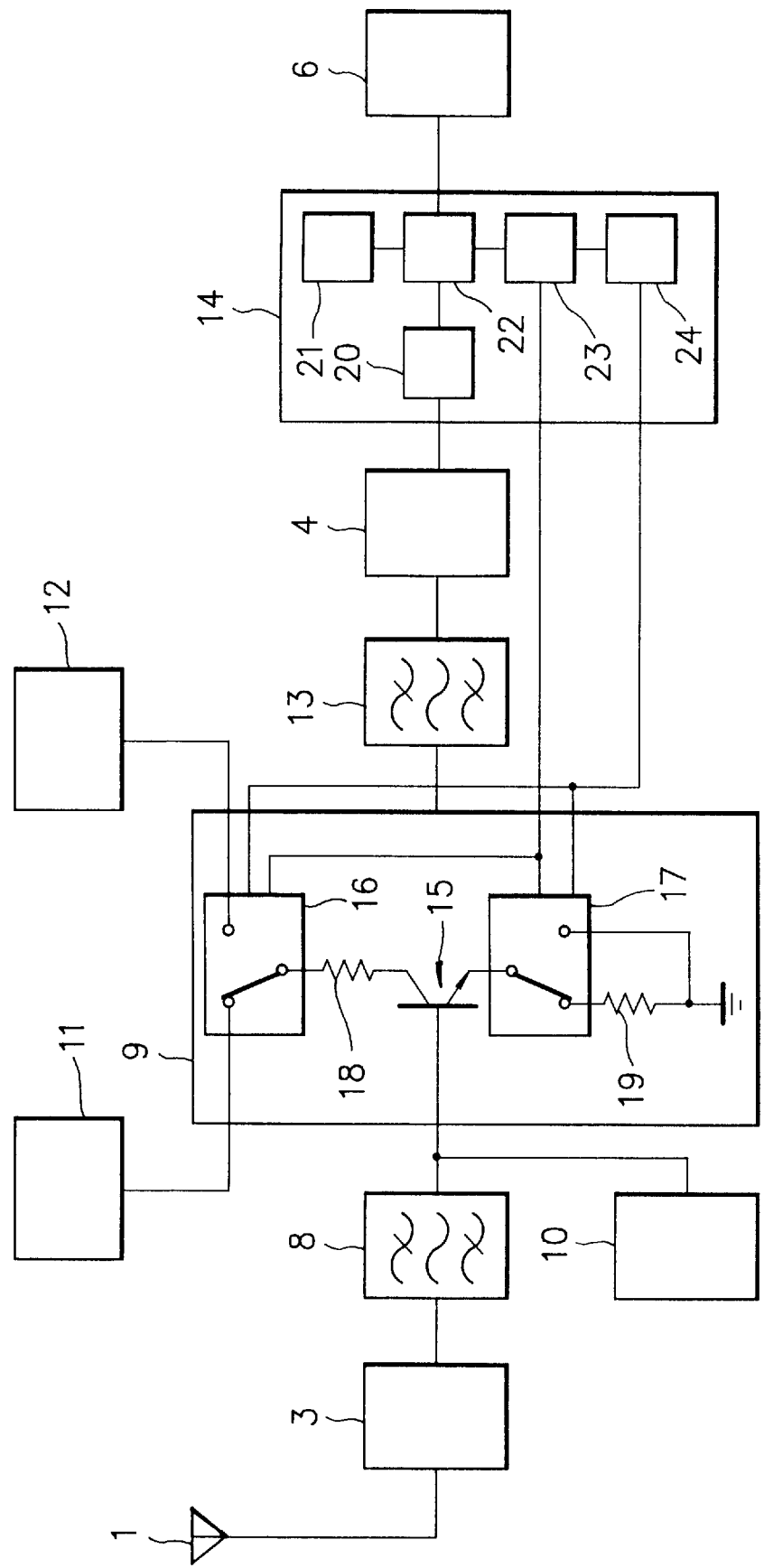
FIG. 2 is a block diagram of a radio selection call receiver according to a first embodiment of this invention.
Figure 3:
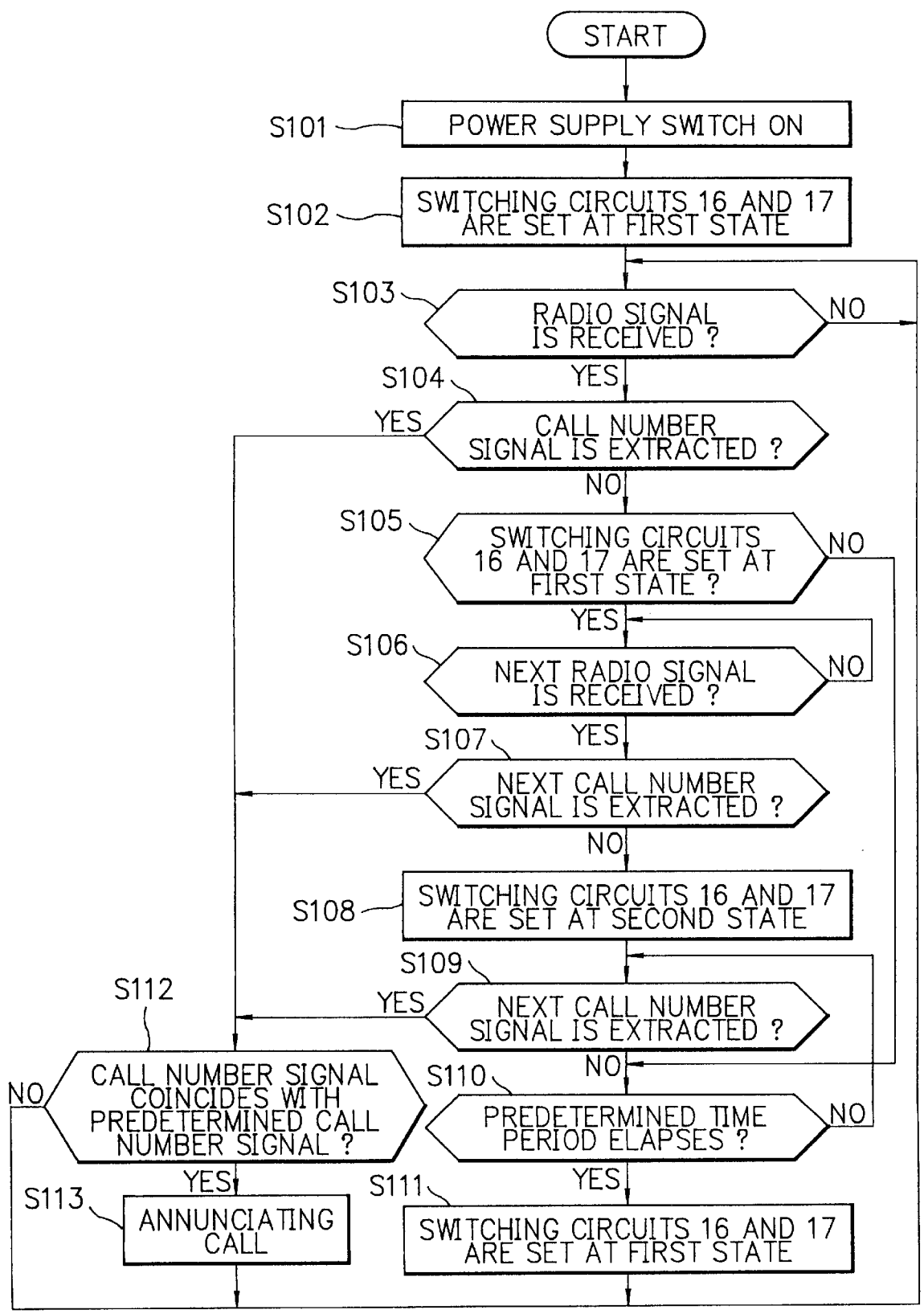
FIG. 3 is a flow chart for use in describing an operation of the radio selection call receiver illustrated in FIG. 2.
Figure 4:
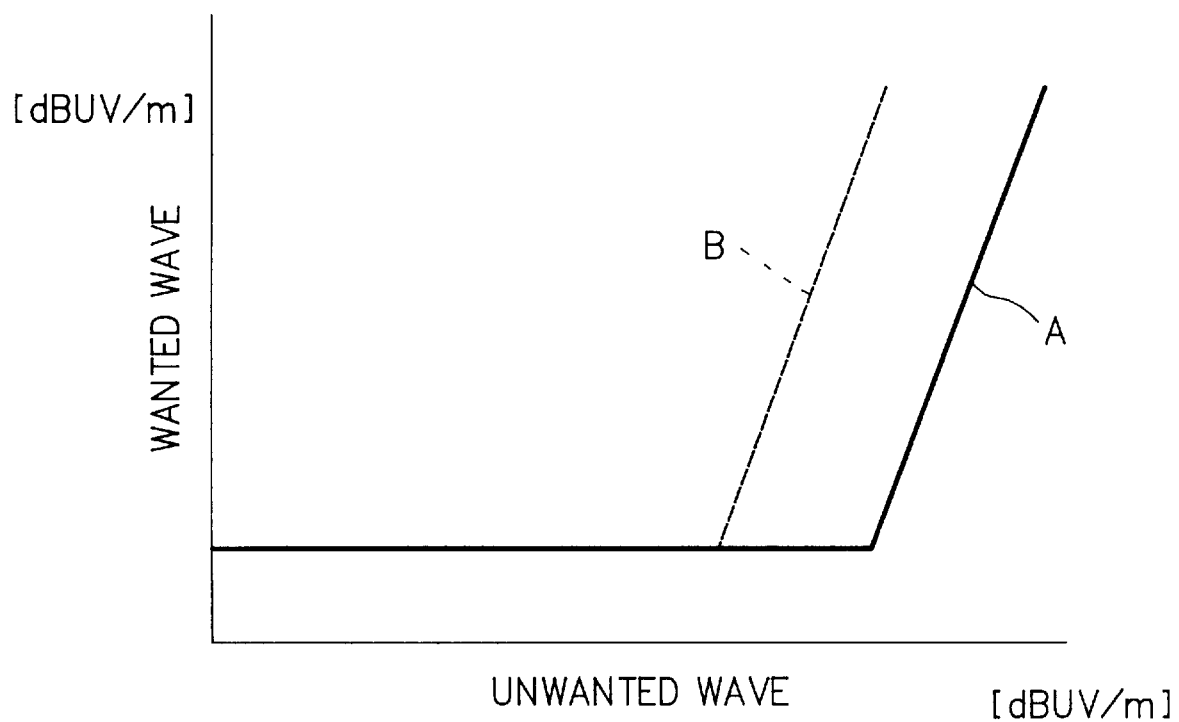
FIG. 4 is a view for use in describing an effect of the radio selection call receiver illustrated in FIG. 2.

Referring to FIGS. 2, 3, and 4, the description will proceed to a radio selection call receiver according to a first embodiment of this invention. Similar parts are designated by like reference numerals.

In FIG. 2, the radio selection call receiver comprises the antenna 1, the high frequency amplifier 3, a first filter 8, a frequency converter 9, a local oscillator 10, a first power supply 11, a second power supply 12, a second filter 13, the demodulator 4, a control circuit 14, and the annunciator 6.

The antenna 1 receives the radio signal and produces the received signal. The high frequency amplifier 3 is connected to the antenna 1. The high frequency amplifier 3 amplifies the received signal to produce an amplified signal. The first filter 8 is connected to the high frequency amplifier 3 and eliminates an undesired wave form the amplified signal to produce a first filtered signal. The frequency converter 9 is connected to the first filter 8 and is supplied with the first filtered signal from the first filter 8.

The local oscillator 10 is connected to the frequency converter 9 and supplies a local oscillator frequency signal to the frequency converter 10. The first and second power supplies 11 and 12 are connected to the frequency converter 9. The frequency converter 9 converts a frequency of the first filtered signal to produce a converted signal. Namely, the frequency converter 9 converts the first filtered signal and the local oscillator frequency signal to produce the converted signal having a frequency which represents a difference between a frequency of the first filtered signal and a frequency of the local oscillator frequency signal.

The frequency converter 9 comprises a transistor 15, a power supply voltage switching circuit 16, a bias switching circuit 17, a first resistor 18, and a second resistor 19. The first power supply 11 and the second power supply 12 are connected to the power supply voltage switching circuit 16. The bias switching circuit 17 is connected to the second resistor 19 and the ground. The transistor 15 has a collector electrode which connected to the power supply voltage switching circuit 16 through the first resistor 18. The transistor 15 has an emitter electrode which is connected to the bias switching circuit 17. The first power supply 11 supplies a first power supply voltage (for example IV) to the frequency converter 9. The second power supply 11 supplies a second power supply voltage (for example 3V) to the frequency converter 9. The second power supply voltage is greater than the first power supply voltage.

The power supply voltage switching circuit 16 and the bias switching circuit 17 are connected to the control circuit 14. The power supply voltage switching circuit 16 switches the first power supply voltage to the second power supply voltage when the power supply voltage switching circuit 16 is supplied with a first control signal from the control circuit 14. Namely, the power supply voltage switching circuit 16 connects the second power supply 12 to the collector electrode of the transistor 15 when the power supply voltage switching circuit 16 is supplied with the first control signal. The bias switching circuit 17 switches a first direct current voltage to a second direct current voltage greater than the first direct current voltage when the bias switching circuit 17 is supplied with the first control signal from the control circuit 14. Namely, the bias switching circuit 17 connects the emitter electrode of the transistor 15 to the second resistor 19. In this event, it is assumed that the power supply voltage switching circuit 16 and the bias switching circuit 17 are set at a second state.

The power supply voltage switching circuit 16 switches the second power supply voltage to the first power supply voltage when the power supply voltage switching circuit 16 is supplied with a second control signal from the control circuit 14. Namely, the power supply voltage switching circuit 16 connects the first power supply 11 to the collector electrode of the transistor 15 when the power supply voltage switching circuit 16 is supplied with the second control signal. The bias switching circuit 17 switches the second direct current voltage to the first direct current voltage when the bias switching circuit 17 is supplied with the second control signal from the control circuit 14. Namely, the bias switching circuit 17 connects the emitter electrode of the transistor 15 to the ground. In this event, it is assumed that the power supply voltage switching circuit 16 and the bias switching circuit 17 are set at a first state.

When the collector electrode of the transistor 15 is connected to the first power supply 11 and when the emitter electrode of the transistor 15 is connected to the ground, the frequency converter 9 has a first dynamic range. When the collector electrode of the transistor 15 is connected to the second power supply 12 and when the emitter electrode of the transistor 15 is connected to the second resistor 19, the frequency converter 9 has a second dynamic range which is greater than the first dynamic range.

Ordinarily, there are radio frequencies which are adjacent to a frequency of the radio signal which is received by the radio selection call receiver. A receiving ratio of the desired wave is decreased by mutual modulation. Also, the mutual modulation of signals is caused in the high frequency amplifier 3 and the frequency converter 9. The frequency converter 9 is set at a low saturation point to obtain a difference between a frequency (for 280 MHZ) of the received signal and a frequency (for 280 MHZ) of the local oscillator frequency signal. As a result, the receiving ratio of the desired wave in the frequency converter 9 is easily decreased by a cross modulation. Therefore, the frequency converter 9 is set at the second dynamic range which is greater than the first dynamic range. Thereby, it is possible to prevent occurrence of the mutual modulation in the frequency converter 9 even when the frequency converter 9 is supplied with signals having a great amplitude.

The second filter 13 is connected to the frequency converter 9. The second filter 13 is supplied with the converted signal from the frequency converter 9. The second filter 13 eliminates a modulation distortion (harmonic distortion) form the converted signal to produce a second filtered signal. The demodulator 4 is connected to the second filter 13. The demodulator 4 demodulates the second filtered signal to produce a demodulated baseband signal.

The control circuit 14 is connected to the demodulator 4 and the frequency converter 9. The control circuit 14 comprises an extracting circuit 20, a memory circuit 21, and a comparing circuit 22. The extracting circuit 20 is connected to the demodulator 4 and is supplied with the demodulated baseband signal from the demodulator 4. The extracting circuit 20 extracts a call number signal from the demodulated baseband signal. The memory circuit 21 memorizes a predetermined call number signal. The comparing circuit 22 is connected to the extracting circuit 20 and the memory circuit 21. The comparing circuit 22 compares the call number signal with the predetermined call number signal to produce a coincidence signal when the call number signal coincides with the predetermined call number signal. The comparing circuit 22 compares the call number signal with the predetermined call number signal to produce a non-coincidence signal when the call number signal does not coincide with the predetermined call number signal. The annunciator 6 is connected to the comparing circuit 22. The annunciator 6 annunciates a call to the person when the annunciator 6 is supplied with the coincidence signal from the comparing circuit 22.

The control circuit 14 further comprises a first control signal generating circuit 23 and a second control signal generating circuit 24. Each of the first and second control signal generating circuits 23 and 24 is connected to the power supply voltage switching circuit 16 and the bias switching circuit 17. The first control signal generating circuit 23 is connected to the comparing circuit 22. The second control signal generating circuit 24 is connected to the first control signal generating circuit 23.

The first control signal generating circuit 23 generates the first control signal when the first control signal generating circuit 23 is supplied with the non-coincidence signal from the comparing circuit 22, namely, when the call number signal does not coincide with the predetermined call number signal. The first control signal generating circuit 23 supplies the first control signal to the power supply voltage switching circuit 16 and the bias switching circuit 17. The second control signal generating circuit 24 generates the second control signal when a predetermined time period elapses after a time instant of producing of the first control signal which is supplied from the first control signal generating circuit 23. The second control signal generating circuit 24 has a timer (not shown) which times the predetermined time period after the time instant of producing of the first control signal. The second control signal generating circuit 24 supplies the second control signal to the power supply voltage switching circuit 16 and the bias switching circuit 17.

When the frequency converter 9 is supplied with the first control signal form the first control signal generating circuit 23, the frequency converter 9 is set at the second dynamic range which is greater than the first dynamic range. Also, when the frequency converter 9 is supplied with the second control signal form the second control signal generating circuit 24, the frequency converter 9 is set at the first dynamic range. As a result, it is possible to decrease a consumption current in the radio selection call receiver.

Referring to FIG. 3 together with FIG. 2, the operation of the radio selection call receiver will be described. At a step S101, the power supply switch (not shown) of the receiver is set at on, namely, the power supply switch is closed. The step S101 proceeds to a step S102 at which the power supply voltage switching circuit 16 and the bias switching circuit 17 are set at the first state. The step S102 proceeds to a step S103 at which the control circuit 14 discriminates whether or not the radio signal is received.

In this event, the base station periodically transmits the radio signals. When the radio signal is received, the step S103 proceeds to a step S104 at which the control circuit 14 discriminates whether or not the call number signal is extracted. When the call number signal is extracted, the step S104 proceeds to a step S112. When the call number signal is not extracted, the step S104 proceeds to a step S105. At the step S105, the control circuit 14 discriminates whether or not the power supply voltage switching circuit 16 and the bias switching circuit 17 are set the first state.

When the power supply voltage switching circuit 16 and the bias switching circuit 17 are not set at the first state, the step S105 proceeds to a step S110. When the power supply voltage switching circuit 16 and the bias switching circuit 17 are set at the first state, the step S105 proceeds to a step S106. At the step S106, the control circuit 14 discriminates whether or not a next radio signal is received. When the next radio signal is received, the step S106 proceeds to a step S107.

At the step S107, the control circuit 14 discriminates whether or not the next call number signal is extracted. When the next call number signal is extracted, the step S107 proceeds to the step S112. When the next call number signal is not extracted, the step S107 proceeds to a step S108. At the step S108, the power supply voltage switching circuit 16 and the bias switching circuit 17 are set at the second state.

The step S108 proceeds to a step S109 at which the control circuit 14 discriminates whether or not the next call number signal is extracted. When the next call number signal is extracted, the step S109 proceeds to a step S112. When the next call number signal is not extracted, the step S109 proceeds to a step S110. At the step S110, the control circuit 14 discriminates whether or not the predetermined time period elapses. When the predetermined time period does not elapse, the step S110 returns to the step S109. When the predetermined time period elapses, the step S110 proceeds to a step S111 at which the power supply voltage switching circuit 16 and the bias switching circuit 17 are set at the first state. The step S111 returns to the step S103.

At the step S112, the control circuit 14 discriminates whether or not the call number signal coincides with the predetermined call number signal. When the call number signal does not coincide with the predetermined call number signal, the step S112 returns to the step S103. When the call number signal coincides with the predetermined call number signal, the step S112 proceeds to a step S113 at which the annunciator 6 annunciates the call. The step S113 returns to the step S103.

Referring to FIG. 4, an improvement example of the receiving ratio of the desired wave is shown. It is assumed that the frequency converter 9 is supplied with the desired wave and the two undesired waves. Since a combination of the two undesired waves has a frequency which is equal to a frequency of the desired wave, the receiving ratio of the desired wave is decreased by the cross modulation. Also, since the combination of the two undesired waves has a frequency which is equal to a frequency of the desired wave, the decrease of the receiving ratio of the desired wave is remarkably affected by a tertiary distortion. Therefore, a characteristic of a tertiary mutual modulation of three signals is extremely important. An abscissa axies of FIG. 4 represents levels of the two desired wave (the two desired wave have the same level). An ordinate axies of FIG. 4 represents a level of the desired wave. When the level of the undesired wave becomes higher, the receiver can receive the desired wave only when the level of the desired wave is higher. In FIG. 4, a line A represents a receiving ratio of the receiver of this invention and a dashed line B represents a receiving ratio of the conventional receiver. The receiving ratio of the desired wave in the receiver of this invention is increased by about 10 db.

Figure 5:
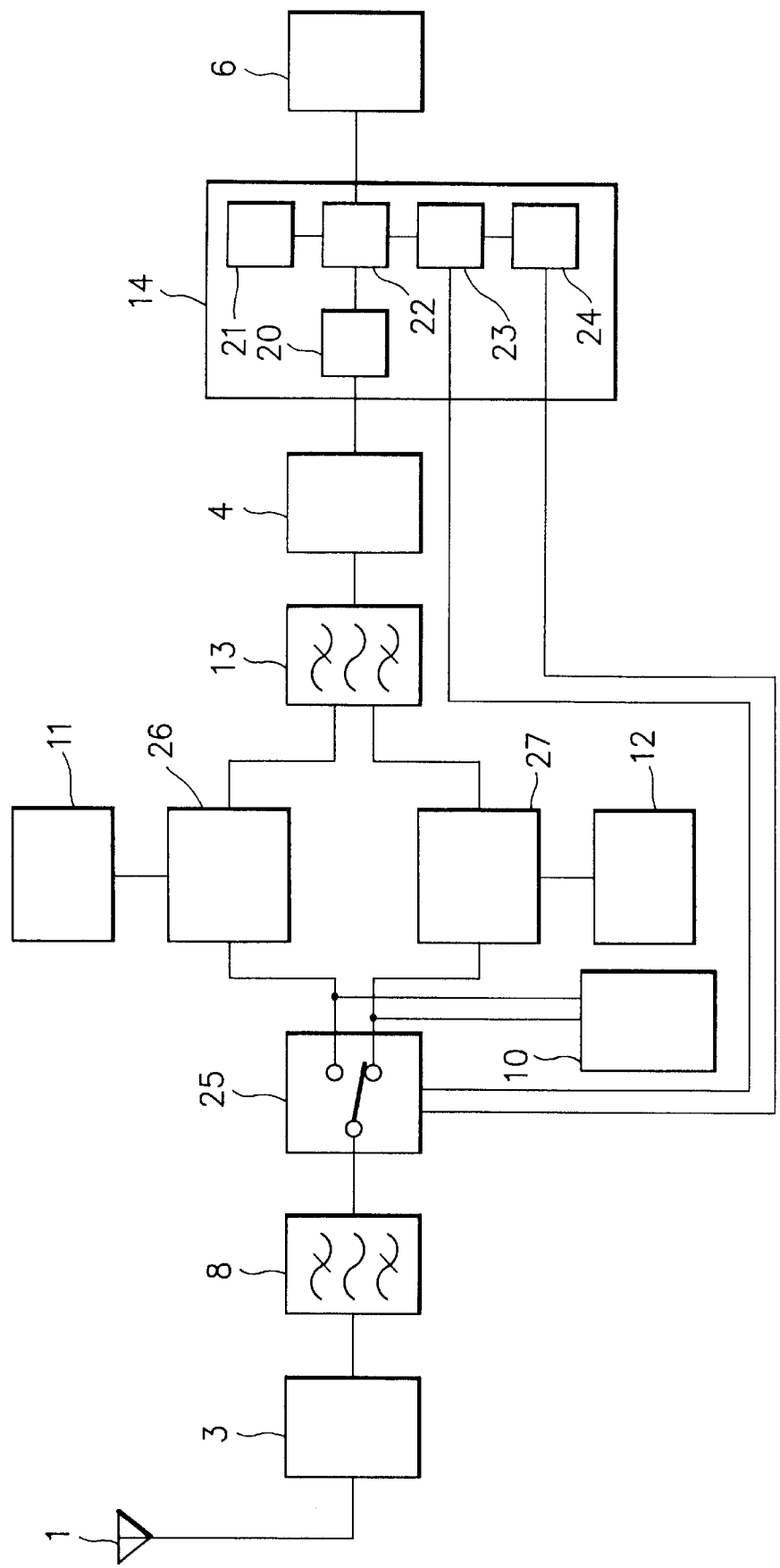
FIG. 5 is a block diagram of a radio selection call receiver according to a second embodiment of this invention.

Referring to FIG. 5, the description will proceed to a radio selection call receiver according to a second embodiment of this invention. Similar parts are designated by like reference numerals.

The radio selection call receiver comprises a switching circuit 25 and first and second frequency converters 26 and 27 instead of the frequency converter 9 in the radio selection call receiver of FIG. 2.

The switching circuit 25 is connected between the first filter 8 and the first and second frequency converters 26 and 27. The local oscillator 10 is connected to the first and second frequency converters 26 and 27. The first frequency converter 26 is connected to the first filter 8 through the switching circuit 25. The first power supply 11 is connected to the first frequency converter 26. The first frequency converter 26 has the first dynamic range. The first frequency converter 26 converts the frequency of the first filtered signal to produce a first converted signal. The second frequency converter 27 is connected to the first filter 8 through the switching circuit 25. The second power supply 12 is connected to the second frequency converter 27. The second frequency converter 27 has the second dynamic range greater than the first dynamic range. The second frequency converter 27 converts the frequency of the first filtered signal to produce a second converted signal. The demodulator 13 is connected to the first and second frequency converters 26 and 27. The demodulator 13 demodulates one of the first and second converted signals to produce the demodulated baseband signal.

The switching circuit is further connected to the first and second control signal generating circuits 22 and 23. The switching circuit is supplied with the first and second control signals from the first and second control signal generating circuits 22 and 23. The switching circuit 26 switches from the first frequency converter 26 to the second frequency converter 27 to connect the first filter 8 to the second frequency converter 27 when the switching circuit 25 is supplied with the first control signal. The switching circuit 25 switches from the second frequency converter 27 to the first frequency converter 26 to connect the first filter 8 to the first frequency converter 26 when the switching circuit 25 is supplied with the second control signal.

Figure 6:
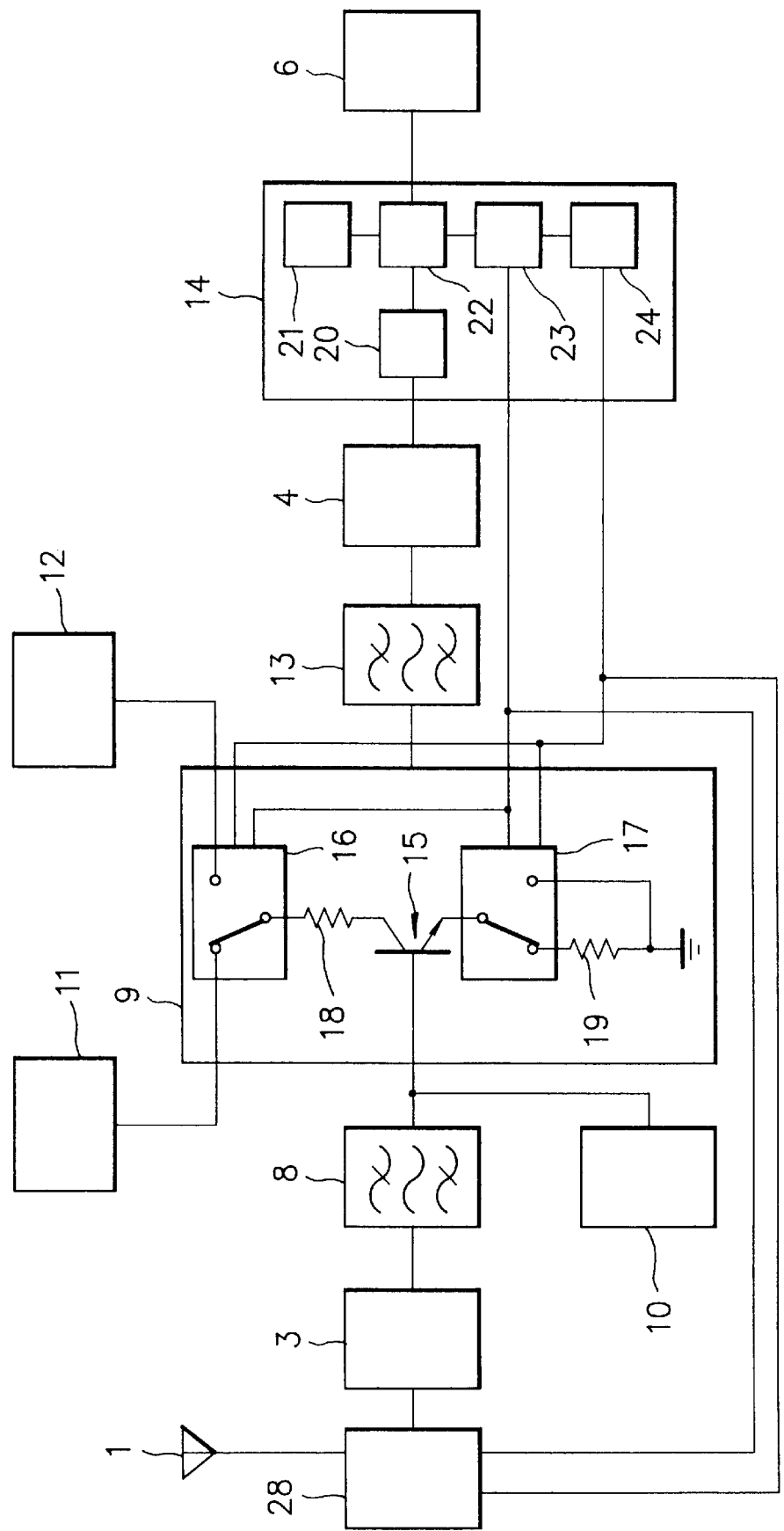
FIG. 6 is a block diagram of a radio selection call receiver according to a third embodiment of this invention.

Referring to FIG. 6, the description will proceed to a radio selection call receiver according to a third embodiment of this invention. Similar parts are designated by like reference numerals.

The radio selection call receiver further comprises an attenuator 28 in the radio selection call receiver of FIG. 2. The attenuator 28 is connected between the antenna 1 and the high frequency amplifier 3. The attenuator 28 is further connected to the first and second control signal generating circuits 22 and 23. The attenuator 28 is supplied with the first and second control signals from the first and second control signal generating circuits 22 and 23. The attenuator 28 attenuates the received signal form the antenna 1 to produce an attenuated signal and to supply the attenuated signal as the received signal to the high frequency amplifier 3 when the attenuator 28 is supplied with the first control signal. The attenuator 28 supplies the received signal from the antenna 1 to the high frequency amplifier 3 when the attenuator 28 is supplied with the second control signal.

While this invention has thus far been described in conjunction with a few preferred embodiments thereof, it will readily be possible for those skilled in the art to put this invention into practice in various other manners. For example, the radio selection call receiver may further comprises the attenuator 28 in the radio selection call receiver of FIG. 5.

What is claimed is:

1. A radio selection call receiver comprising:

an antenna for receiving a radio signal to produce a received signal;

a high frequency amplifier connected to said antenna for amplifying said received signal to produce an amplified signal;

a filter connected to said high frequency amplifier for eliminating an undesired wave form said amplified signal to produce a filtered signal;

a frequency converter connected to said filter for converting a frequency of said filtered signal to produce a converted signal;

a demodulator connected to said frequency converter for demodulating said converted signal to produce a demodulated baseband signal;

a control circuit connected to said demodulator and comprising an extracting circuit for extracting a call number signal from said demodulated baseband signal, a memory circuit for memorizing a predetermined call number signal, and a comparing circuit connected to said extracting circuit and said memory circuit for comparing said call number signal with said predetermined call number signal to produce a coincidence signal when said call number signal coincides with said predetermined call number signal; and an annunciator connected to said control circuit for annunciating a call when said annunciator is supplied with said coincidence signal;

said frequency converter connected to said control circuit and comprising a power supply voltage switching circuit for switching one of power supply voltages to another of said power supply voltages when said power supply voltage switching circuit is supplied with a control signal and a bias switching circuit for switching one of direct current voltages to another of said direct current voltages when said bias switching circuit is supplied with said control signal;

said control circuit connected to said power supply voltage switching circuit and said bias switching circuit and comprising a control signal generating circuit for generating a control signal when said call number signal does not coincide with said predetermined call number signal, said control signal generating circuit being for supplying said control signal to said power supply voltage switching circuit and said bias switching circuit.

2. A radio selection call receiver as claimed in claim 1, said radio selection call receiver further comprising an attenuator connected among said antenna, said high frequency amplifier, and said control circuit for supplying said received signal from said antenna to said high frequency amplifier when said attenuator is not supplied with said control signal from said control circuit, said attenuator being for attenuating said received signal form said antenna to produce an attenuated signal and to supply said attenuated signal as said received signal to said high frequency amplifier when said attenuator is supplied with said control signal from said control circuit.

3. A radio selection call receiver comprising:

an antenna for receiving a radio signal to produce a received signal;

a high frequency amplifier connected to said antenna for amplifying said received signal to produce an amplified signal;

a filter connected to said high frequency amplifier for eliminating an undesired wave form said amplified signal to produce a filtered signal;

a frequency converter connected to said filter for converting a frequency of said filtered signal to produce a converted signal;

a demodulator connected to said frequency converter for demodulating said converted signal to produce a demodulated baseband signal;

a control circuit connected to said demodulator and comprising an extracting circuit for extracting a call number signal from said demodulated baseband signal, a memory circuit for memorizing a predetermined call number signal, and a comparing circuit connected to said extracting circuit and said memory circuit for comparing said call number signal with said predetermined call number signal to produce a coincidence signal when said call number signal coincides with said predetermined call number signal; and an annunciator connected to said control circuit for annunciating a call when said annunciator is supplied with said coincidence signal;

said frequency converter connected to said control circuit and comprising a power supply voltage switching circuit for switching a first power supply voltage to a second power supply voltage greater than said first power supply voltage when said power supply voltage switching circuit is supplied with a first control signal from said control circuit and a bias switching circuit for switching a first direct current voltage to a second direct current voltage greater than said first direct current voltage when said bias switching circuit is supplied with said first control signal from said control circuit, said power supply voltage switching circuit being for switching said second power supply voltage to said first power supply voltage when said power supply voltage switching circuit is supplied with a second control signal form said control circuit, said bias switching circuit being for switching said second direct current voltage to said first direct current voltage when said bias switching circuit is supplied with said second control signal form said control circuit;

said control circuit connected to said power supply voltage switching circuit and said bias switching circuit and comprising a first control signal generating circuit and a second control signal generating circuit, said first control signal generating circuit being for generating said first control signal when said call number signal does not coincide with said predetermined call number signal to supply said first control signal to said power supply voltage switching circuit and said bias switching circuit, said second control signal generating circuit being for generating said second control signal when a predetermined time period elapses after a time instant of producing of said first control signal to supply said second control signal to said power supply voltage switching circuit and said bias switching circuit.

4. A radio selection call receiver as claimed in claim 3, said radio selection call receiver further comprising an attenuator connected among said antenna, said high frequency amplifier, and said control circuit for attenuating said received signal form said antenna to produce an attenuated signal and to supply said attenuated signal as said received signal to said high frequency amplifier when said attenuator is supplied with said first control signal from said first control signal generating circuit, said attenuator being for supplying said received signal from said antenna to said high frequency amplifier when said attenuator is supplied with said second control signal from said second control signal generating circuit.

5. A radio selection call receiver comprising:

an antenna for receiving a radio signal to produce a received signal;

a high frequency amplifier connected to said antenna for amplifying said received signal to produce an amplified signal;

a filter connected to said high frequency amplifier for eliminating an undesired wave form said amplified signal to produce a filtered signal;

a switching circuit connected to said filter;

a first frequency converter connected to said filter through said switching circuit and having a first dynamic range for converting a frequency of said filtered signal to produce a first converted signal;

a second frequency converter connected to said filter through said switching circuit and having a second dynamic range greater than said first dynamic range for converting a frequency of said filtered signal to produce a second converted signal;

a demodulator connected to said first and second frequency converters for demodulating one of said first and second converted signals to produce a demodulated baseband signal;

a control circuit connected to said demodulator and comprising an extracting circuit for extracting a call number signal from said demodulated baseband signal, a memory circuit for memorizing a predetermined call number signal, and a comparing circuit connected to said extracting circuit and said memory circuit for comparing said call number signal with said predetermined call number signal to produce a coincidence signal when said call number signal coincides with said predetermined call number signal; and an annunciator connected to said control circuit for annunciating a call when said annunciator is supplied with said coincidence signal;

said switching circuit connected to said control circuit for switching from said first frequency converter to said second frequency converter to connect said filter to said second frequency converter when said switching circuit is supplied with a control signal;

said control circuit connected to said switching circuit and comprising a control signal generating circuit for generating a control signal when said call number signal does not coincide with said predetermined call number signal, said control signal generating circuit being for supplying said control signal to said switching circuit.

6. A radio selection call receiver as claimed in claim 5, said radio selection call receiver further comprising an attenuator connected among said antenna, said high frequency amplifier, and said control circuit for supplying said received signal from said antenna to said high frequency amplifier when said attenuator is not supplied with said control signal from said control circuit, said attenuator being for attenuating said received signal form said antenna to produce an attenuated signal and to supply said attenuated signal as said received signal to said high frequency amplifier when said attenuator is supplied with said control signal from said control circuit.

7. A radio selection call receiver comprising:

an antenna for receiving a radio signal to produce a received signal;

a high frequency amplifier connected to said antenna for amplifying said received signal to produce an amplified signal;

a filter connected to said high frequency amplifier for eliminating an undesired wave form said amplified signal to produce a filtered signal;

a switching circuit connected to said filter;

a first frequency converter connected to said filter through said switching circuit and having a first dynamic range for converting a frequency of said filtered signal to produce a first converted signal;

a second frequency converter connected to said filter through said switching circuit and having a second dynamic range greater than said first dynamic range for converting a frequency of said filtered signal to produce a second converted signal;

a demodulator connected to said first and second frequency converters for demodulating one of said first and second converted signals to produce a demodulated baseband signal;

a control circuit connected to said demodulator and comprising an extracting circuit for extracting a call number signal from said demodulated baseband signal, a memory circuit for memorizing a predetermined call number signal, and a comparing circuit connected to said extracting circuit and said memory circuit for comparing said call number signal with said predetermined call number signal to produce a coincidence signal when said call number signal coincides with said predetermined call number signal; and an annunciator connected to said control circuit for annunciating a call when said annunciator is supplied with said coincidence signal;

said switching circuit connected to said control circuit for switching from said first frequency converter to said second frequency converter to connect said filter to said second frequency converter when said switching circuit is supplied with a first control signal from said control circuit, said switching circuit being for switching from said second frequency converter to said first frequency converter to connect said filter to said first frequency converter when said switching circuit is supplied with a second control signal from said control circuit;

said control circuit connected to said switching circuit and comprising a first control signal generating circuit and a second control signal generating circuit, said first control signal generating circuit being for generating said first control signal when said call number signal does not coincide with said predetermined call number signal, said first control signal generating circuit being for supplying said first control signal to said switching circuit, said second control signal generating circuit being for generating said second control signal when a predetermined time period elapses after a time instant of producing of said first control signal, said second control signal generating circuit being for supplying said second control signal to said switching circuit.

8. A radio selection call receiver as claimed in claim 7, said radio selection call receiver further comprising an attenuator connected among said antenna, said high frequency amplifier, and said control circuit for attenuating said received signal form said antenna to produce an attenuated signal and to supply said attenuated signal as said received signal to said high frequency amplifier when said attenuator is supplied with said first control signal from said first control signal generating circuit, said attenuator being for supplying said received signal from said antenna to said high frequency amplifier when said attenuator is supplied with said second control signal from said second control signal generating circuit.

* * * * *